United States Patent Office 2,947,734
Patented Aug. 2, 1960

---

2,947,734

COPOLYMER OF 2,2,2-TRIFLUOROETHYL ACRYLATE AND VINYLIDENE CHLORIDE

Benjamin D. Halpern, Jenkintown, and Wolf Karo, Elkins Park, Pa., assignors to The Borden Company, New York, N.Y., a corporation of New Jersey No Drawing. Filed Apr. 9, 1958, Ser. No. 727,235

1 Claim. (Cl. 260—86.3)

This invention relates to a new material capable of forming transparent, easily milled, leathery sheets. In particular it relates to a new copolymer of trifluoroethyl acrylate which can be readily formed into heat- and solvent-resistant, transparent, extensible, easily milled, leathery sheets without use of plasticizer.

The composition of matter of this invention consists of a copolymer of 75 to 98 parts of 2,2,2-trifluoroethyl acrylate and 2 to 25 parts of vinylidene chloride. The polymerization may be done in bulk, emulsion, or aqueous suspension, but especially readily in aqueous suspension wherein approximately 0.001% to 1.000% by weight with respect to the monomer of an organic peroxide is used as the catalyst and the suspending agent is an organic, water-binding material such as starch, polyvinyl alcohol, or polyacrylate salt. Sheeting under pressure and moderate temperatures (e.g. 80–175° C.) is easily done to yield flexible, transparent sheets which are clear, extensible and leathery in character. The materials are suitable for extruding into tubing for corrosive liquids and as such provide a unique product—a transparent conduit for corrosive liquids. Other uses for the material in sheet form are as barriers for corrosive liquids, fuels and solvents and as a safety glass interlayer. No plasticizer is needed for any of these uses, and in addition the products are easily milled. The absence of plasticizer avoids all the common problems of instability, blooming, cracking and the like.

Trifluoroethyl acrylate is prepared by reacting 2,2,2-trifluoroethanol (B.P. 74.05° C., $d_{22}$. 1.3739 g./ml.) with acrylyl chloride in the presence of triethylamine. This reaction produces the trifluoroethyl ester of acrylic acid. The physical properties of trifluoroethyl acrylate are as follows:

Boiling point _____° C.___ 91–92
Refractive index (25° C.) _____ 1.3475

Vinylidene chloride is a well-known monomer, usually obtained by pyrolysis of trichloroethane at 400° C., but may also be prepared by chlorination of ethylene chloride in a salt bath or by dropping trichloroethane on a mixture of potassium hydroxide or lime in methanol or ethanol at 60° C. The physical properties of vinylidene chloride are as follows:

Boiling point _____° C.___ 31.7
Refractive index (20° C.) _____ 1.4249

Illustrative examples follow:

*Example 1*

18.6 gm. of trifluoroethyl acrylate, 0.02 gm. benzoyl peroxide, and 4.12 gms. of vinylidene chloride were mixed together and dispersed in 100 ml. of 0.3% aqueous solution of polyvinyl alcohol. The mass was transferred to a beverage bottle, sealed with a crown cap, and then shaken in an 80° C. water bath for 24 hours. The resulting mixture comprised granules of polymer precipitated in the aqueous solution. The granules were filtered and repeatedly washed with hot water to yield 23 grams of copolymer.

*Example 2*

Example 1 was repeated except that the monomer formulation was 22.4 gms. trifluoroethyl acrylate, 1.95 gms. vinylidene chloride, and 0.02 gm. benzoyl peroxide. The yield here was 22 gms.

Both the products of Example 1 and Example 2 when sheeted between stainless steel plates at 5000 p.s.i. at a temperature of about 110° C. provided flexible, transparent, leathery sheets which returned to their original shape after moderate deformation. Example 1 product had a tensile strength of 635 p.s.i. and elongation of 380%. Both products exhibited no change in physical properties after 100 hours immersion in the following liquids at 60° C.: water, ethanol, fuel oil, 10% acetic acid, 10% sodium hydroxide, 10% sulfuric acid and 10% hydrochloric acid.

We claim:

The copolymer of 75 to 98 parts by weight of the 2,2,2-trifluoroethyl ester of acrylic acid and 2 to 25 parts by weight of vinylidene chloride.

References Cited in the file of this patent

UNITED STATES PATENTS

| | | |
|---|---|---|
| 2,412,475 | Semegen | Dec. 10, 1946 |
| 2,628,958 | Bittles | Feb. 17, 1953 |
| 2,834,763 | Halpern et al. | May 13, 1958 |

FOREIGN PATENTS

| | | |
|---|---|---|
| 580,665 | Great Britain | Sept. 16, 1946 |
| 606,384 | Great Britain | Aug. 12, 1948 |